Aug. 14, 1923.  1,464,941
W. J. KEEGAN, JR., ET AL
TIRE CARRIER
Filed July 30, 1921   4 Sheets-Sheet 1
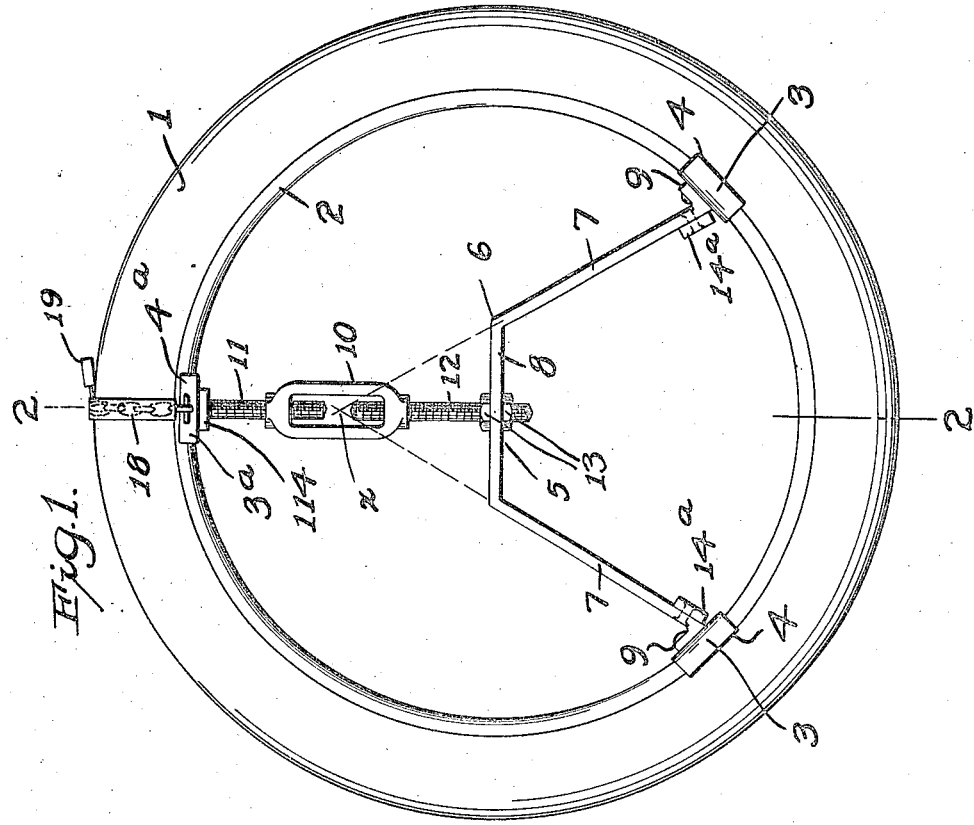
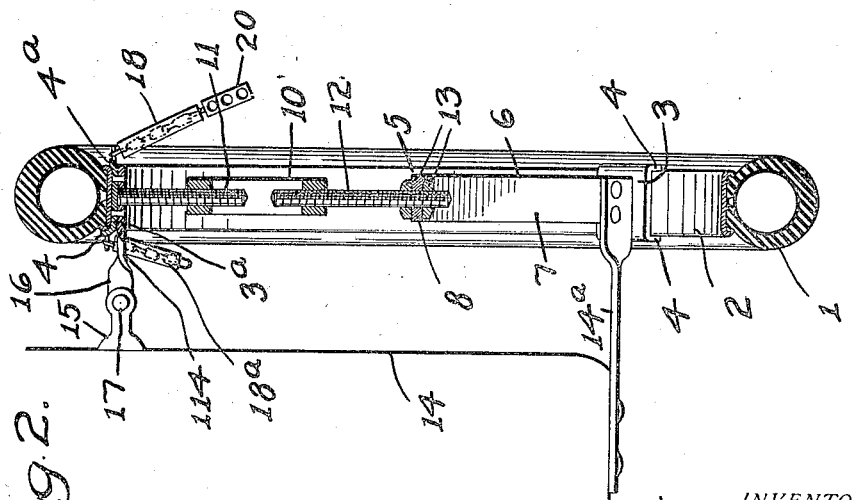
INVENTORS
BY
ATTORNEY

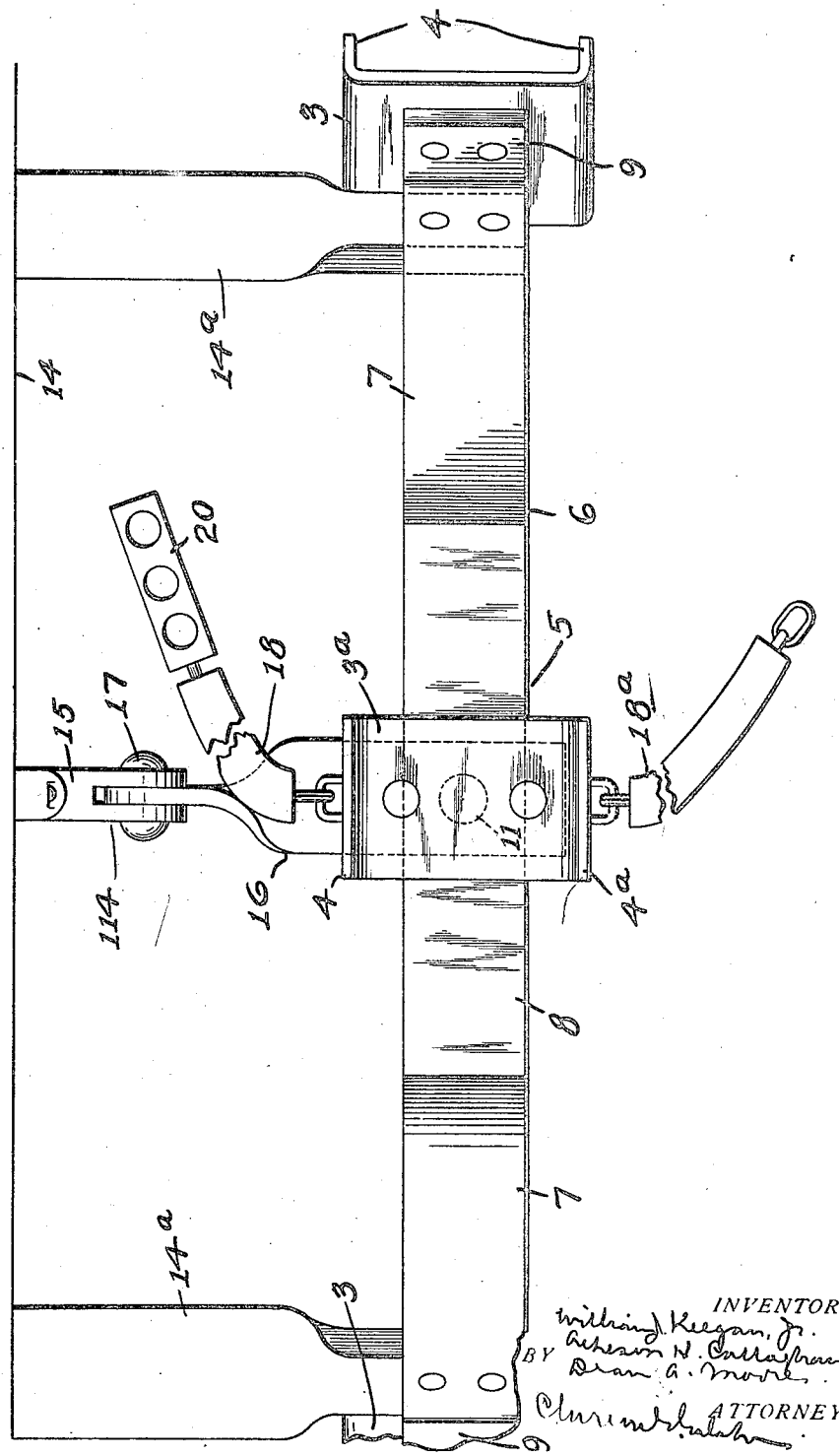

Aug. 14, 1923.
W. J. KEEGAN, JR., ET AL
1,464,941
TIRE CARRIER
Filed July 30, 1921    4 Sheets-Sheet 4
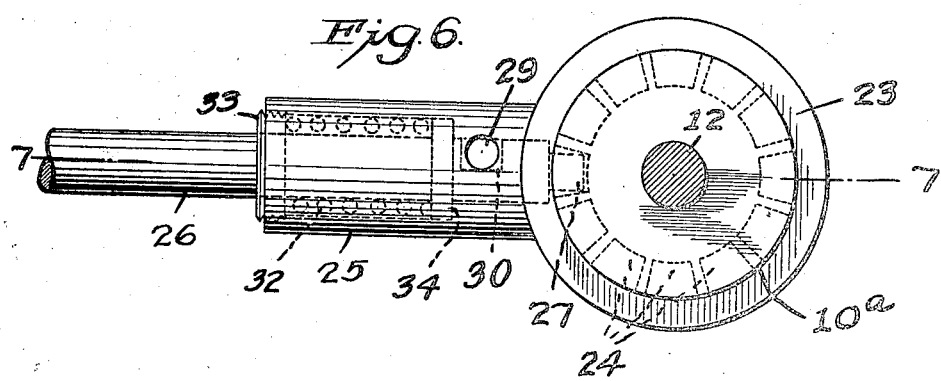
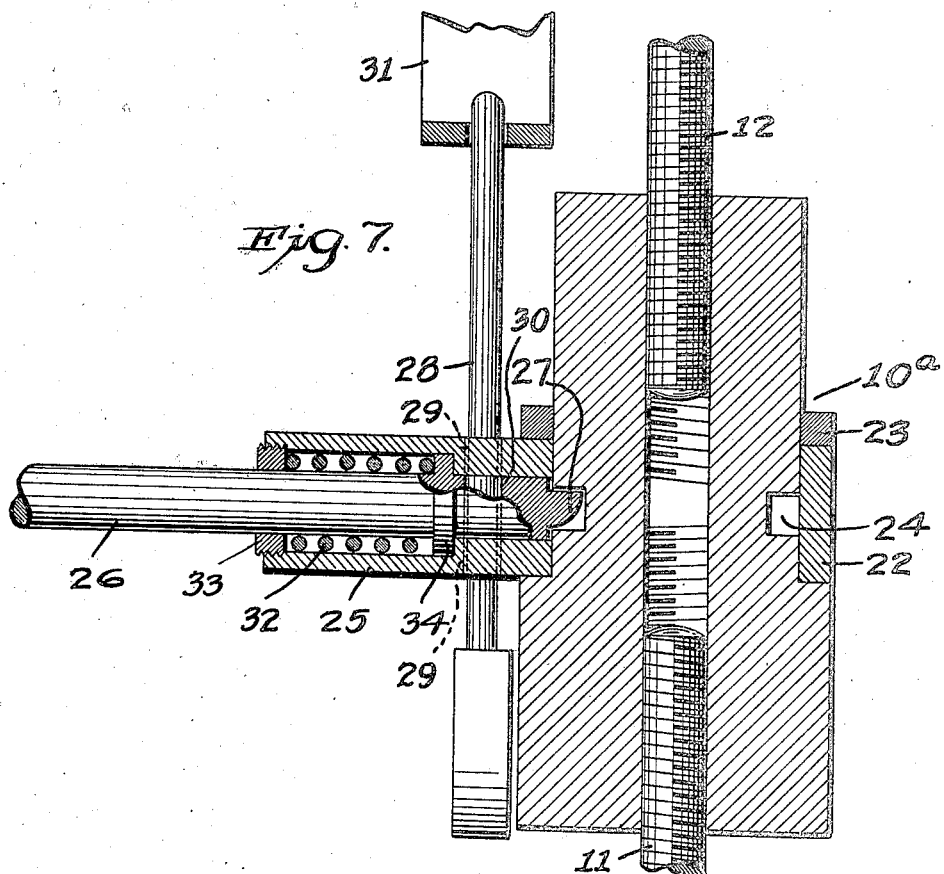
INVENTORS
William J. Keegan, Jr.
BY
ATTORNEY Patented Aug. 14, 1923.

1,464,941

UNITED STATES PATENT OFFICE.

WILLIAM J. KEEGAN, JR., OF ELMHURST, ACHESON H. CALLAGHAN, OF BROOKLYN, AND DEAN A. MOORE, OF NEW YORK, N. Y.

TIRE CARRIER.

Application filed July 30, 1921. Serial No. 488,737.

*To all whom it may concern:*

Be it known that we, WILLIAM J. KEEGAN, Jr., ACHESON H. CALLAGHAN and DEAN A. MOORE, citizens of the United States, residing, respectively, in Elmhurst, State of New York, Brooklyn, city of New York, State of New York, and New York city, State of New York, have jointly invented a new and useful Improvement in a Tire Carrier, of which the following is a specification.

The invention relates to the means for carrying one or more spare tires on an automobile, more especially on the rear end thereof, and the object is to provide a strong and comparatively simple tire-carrier, adapted to hold a tire on its demountable rim, whereby the tire so mounted is held in a secure and improved manner, and is readily affixed and removed. A further object is to provide such a tire-carrier with advantageous means for locking against theft.

In the accompanying drawings, forming a part hereof, and wherein two preferred and illustrative embodiments of the invention are shown:

Fig. 1 is an elevation of the tire carrier looking towards the rear of the vehicle to which the carrier is attached.

Fig. 2 is a sectional view taken on the line 2—2 of Fig. 1 showing the locking chains released.

Fig. 3 is a top plan view with the rim and tire removed from the carrier.

Fig. 6 is an enlarged detail view taken on the line 6—6 of Fig. 4.

Fig. 7 is a longitudinal sectional view on the same scale as Fig. 6 taken on the line 7—7 of Fig. 6.

Figure 4:
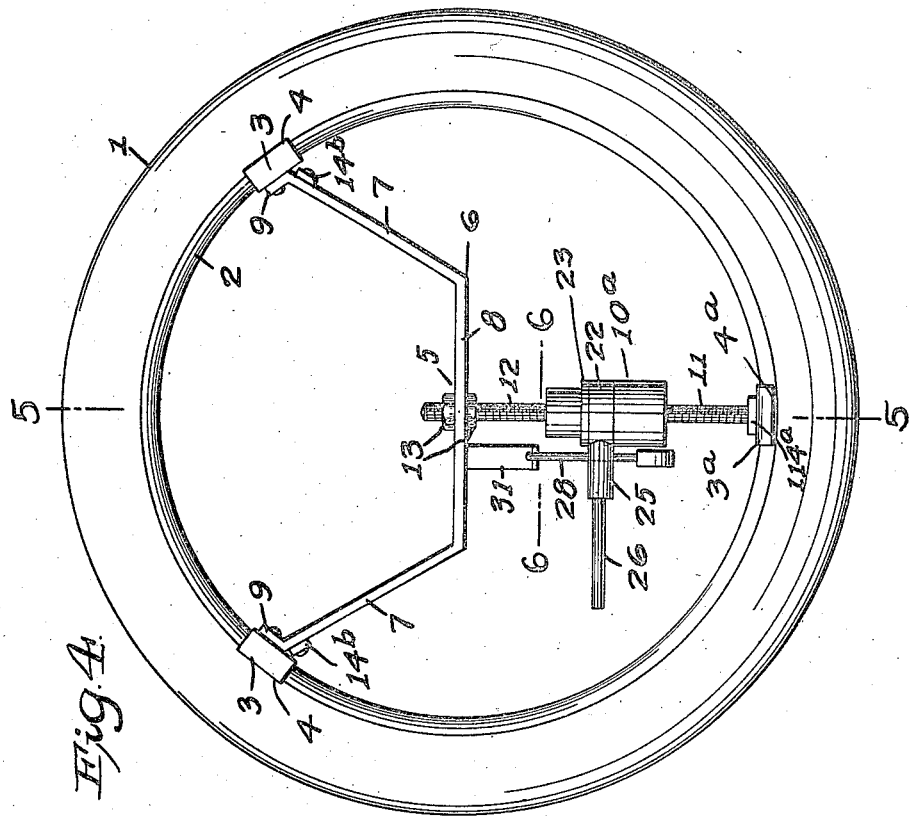
Fig. 4 is a view similar to Fig. 1 of an alternative construction.

The tire-carrier of the invention is illustrated in connection with an ordinary automobile tire 1 and its rim 2. The carrier has three channeled shoe members 3, 3, 3ª, formed to bear outward against the inner periphery of the rim 2 at suitably spaced points, and to embrace the edges of the rim with their flanges 4 so as to retain the tire and shoe against displacement. The outer flange 4ª of the shoe 3ª is preferably abbreviated, to facilitate application and removal of the tire and rim.

These shoe members are on the outer ends of the limbs of a three-legged spider-frame 5, which stands within the circle of the rim. One part 6 of this frame is bent from strap-iron or other suitable material to present two diverging legs 7 and a uniting cross-portion 8. The extremities 9 of the legs 7 are bent to form seats to which the shoes 3, 3 are riveted or otherwise secured. The third leg of the frame, as illustrated in Figs. 1 to 3, comprises an operating screw device, in the shape of an ordinary right- and left-threaded turn-buckle 10, with its accompanying stud-bolts 11 and 12, one right-threaded and the other left-threaded, the rear end of the bolt 11 being connected to the shoe 3ª and the rear end of bolt 12 passing through a hole in the center of the cross-portion 8, where it is held by nuts 13.

The carrier is supported from the vehicle, the back of which is indicated at 14, by three brackets 14ª, 14ª, 114, which are connected to the shoe and spider structure at or near the shoe members 3, 3, 3ª. In the form illustrated in Figs. 1 to 3, the brackets 14ª are rigid members suitably secured to and projecting rearward from the car, and riveted at their rear ends to the legs 7 adjacent the shoes 3. The bracket 114, which is connected to the shoe 3ª and the adjustable leg containing the turn-buckle, comprises two members 15 and 16, knuckle-jointed or hinged at 17, the member 15 being fixed to the back of the car and the member 16 being riveted to the shoe 3ª. The hinge 17 permits the relative expanding and contracting movement of the shoes under the operation of the turn-buckle, the construction being such that movement relative to the car is required of only one of the shoes in order to produce the desired results.

It will be seen that turning of the turn-buckle in one direction forcibly expands the shoes relatively to each other causing them to seize and firmly hold the tire-rim at three points, by outward pressure and the confinement of the flanges. Reverse operation of the turn-buckle relatively contracts or withdraws the shoes, by movement of the shoe 3ª, so that the tire and rim may be taken off.

The tire is further secured and locked by means of two lengths of chain 18, 18ª fixed to opposite sides of the shoe 3ª, these chains being adapted to encircle the tire and to be fastened by a padlock 19. One of the chains carries a plate 20 provided with a number of perforations for the padlock hasp, so that tires of different sizes can be accommodated.

Figure 5:
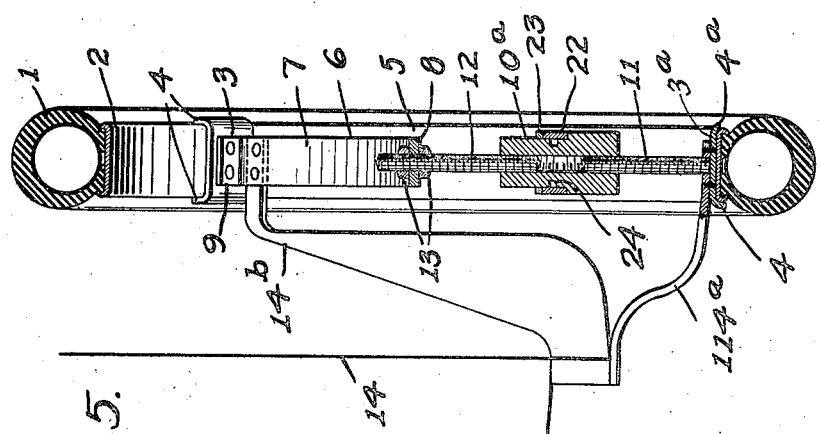
Fig. 5 is a sectional view taken on the line 5—5 of Fig. 4.

In the construction shown in Figs. 4 to 7 modified forms of certain of the parts are seen. The turnbuckle 10ª is of a sleeve type, and has on it a rotatable ratchet ring 22, retained by a collar 23, the ring 22 encircling a circular series of ratchet notches 24 in the exterior of the turn-buckle. The ring has a handle socket 25 projecting laterally from it, and movable longitudinally and also rotatably in the socket is a lever handle 26. The inner end of this handle bears a pawl nose 27, flat on one side and beveled on the other, to enter the notches 24 and to cause rotation of the sleeve 21 in one direction or the other when the sleeve is swung back and forth, according to which of two positions 180° apart in respect to rotation about its longitudinal axis the handle occupies in the socket. In an intermediate position, movement of the handle will merely oscillate the turnbuckle idly back and forth, since the beveled side of the nose cannot ride out of the notch 24 in which it is entered, without withdrawing the shoes sufficiently to permit removal of the tire. This will depend in part upon the pitch of the screws and the length of the operating handle and the obstruction which it will encounter to continued rotation in one direction. An absolute lock may be secured by passing one leg of a lock staple 28 through holes 29 in the socket and a notch 30 in the handle, which notch registers with the holes in this position, and connecting the ends of the legs by a padlock 3. This staple may be suspended from a bracket 31 secured to the cross-portion 8 of the spider member 6.

In its normal operation, the handle 26 works back and forth in the socket, as the beveled face of the nose 27 rides in and out of the notches 24 in the return or idle strokes, and is pressed forward by a spring 32, which lies in the socket between a bushing 33 in the outer end thereof and a collar 34 on the handle. To change the position of the handle it is pulled out against the tension of this spring and turned.

The two forms of the invention shown in the drawings illustrate the fact that the tire-carrier may be disposed in various positions in respect to rotation about the center of the tire circle. Thus, in Figs. 1 to 3 the shoe 3ª and the turn-buckle leg are shown at the top and the shoes 3 and the member 6 in a lower position, while in Figs. 4 to 7, this is reversed. Suitable forms of supporting brackets are shown in the two sets of views, but these may be modified to suit various styles and makes of automobiles without interfering with the essential features of the invention. For light cars with a touring style of body, we prefer the forms of support shown in Figs. 1 to 3. For heavier cars, using larger sizes of tires, the forms indicated in Figs. 4 to 7 are preferred. In the latter views the brackets 14ᵇ are secured at the bottom of the car body and extend upward and rearward to the shoes 3 or the portions of the spider legs 7 adjacent thereto; the bracket 114ª extends from the same region downward and rearward to the shoe 3ª, to which it is secured, and is made resilient to secure the same result as the hinge in the bracket 114.

In the most preferable form of the device the parts are so proportioned and arranged that center lines drawn through the legs 7, if prolonged, would intersect at a point $x$, which point lies on a diameter of a circle, of which the tire rim is the circumference, midway between the center of the circle and its circumference; further these center lines would make with each other an angle of between 60° and 90°; further a center line drawn through the turn-buckle leg would pass through $x$ and the center of the circle and would bisect the angle formed by the prolonged center lines of the legs 7; also the center line of the cross-portion 8 would pass through the center of the circle. It is to be understood, however, that it is not absolutely essential for the working of the device that all or even any of these conditions be exactly or even approximately fulfilled, but the above is the form of our invention which we prefer.

What is claimed as new is:

An automobile tire carrier comprising an internal frame carrying shoes to engage the tire rim, an expanding and contracting screw device in said frame, said device having a rotatable member provided with ratchet notches, a ratchet case and lever socket pivoted on said rotatable member, a lever handle terminating in a pawl nose, said handle being movable longitudinally in the socket and also being capable of being turned about its longitudinal axis, and an anti-theft locking device for locking the handle in the socket so as to render the ratchet inoperative.

WILLIAM J. KEEGAN, Jr.
ACHESON H. CALLAGHAN.
DEAN A. MOORE.